(12) United States Patent
Glazer et al.

(10) Patent No.: US 7,539,860 B2
(45) Date of Patent: May 26, 2009

(54) SINGLE USE USER IDS

(75) Inventors: Elliott Glazer, Chesterfield, VA (US); Fred Bishop, Glendale, AZ (US); Jeff S. Fehlhaber, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 852 days.

(21) Appl. No.: 10/804,429

(22) Filed: Mar. 18, 2004

(65) Prior Publication Data

US 2008/0083024 A1 Apr. 3, 2008

(51) Int. Cl.
*H04L 9/00* (2006.01)
*H04N 7/16* (2006.01)
*H04K 1/00* (2006.01)

(52) U.S. Cl. .......................... 713/155; 713/182; 725/5; 725/6; 705/53; 705/65

(58) Field of Classification Search ................ 713/184, 713/155, 182; 726/4, 8; 725/5, 6; 705/53, 705/65
See application file for complete search history.

(56) References Cited

U.S. PATENT DOCUMENTS

| | | | |
|---|---|---|---|
| 5,604,803 A * | 2/1997 | Aziz | ........................... 713/155 |
| 5,715,399 A | 2/1998 | Bezos | |
| 5,770,843 A | 6/1998 | Rose et al. | |
| 5,914,472 A | 6/1999 | Foladare et al. | |
| 5,930,767 A | 7/1999 | Reber et al. | |
| 5,949,044 A | 9/1999 | Walker et al. | |
| 5,953,710 A | 9/1999 | Fleming | |
| 5,991,748 A | 11/1999 | Taskett | |
| 6,021,943 A | 2/2000 | Chastain | |
| 6,029,890 A | 2/2000 | Austin | |
| 6,044,360 A | 3/2000 | Picciallo | |
| 6,067,621 A * | 5/2000 | Yu et al. | ..................... 713/172 |
| 6,078,908 A | 6/2000 | Schmitz | |

(Continued)

OTHER PUBLICATIONS

Greene, Thomas C., "American Express offers temporary CC numbers for the Web", http://www.theregister.co.uk/2000/09/09/american_express_offers_temporary_cc/print.html (Sep. 9, 2000).

(Continued)

*Primary Examiner*—Nasser G Moazzami
*Assistant Examiner*—Mohammad W Reza
(74) *Attorney, Agent, or Firm*—Fitzpatrick, Cella, Harper & Scinto

(57) ABSTRACT

An access verifier may act as an intermediary to allow users to receive single use user IDs while protecting their anonymity. The access verifier has some relationship with the user that allows the access verifier to know details regarding the user that might be helpful in determining whether the user is a potentially desirable customer. The user may request a user ID from the access verifier. The user may then pass the user ID to the access provider when the user wishes to gain access. Upon receiving the user ID, the access provider may request verification that the ID is valid from the access verifier. The access verifier may respond that the ID is valid (if appropriate), and also may include user information. The access provider is thereby provided with some level of assurance that the user is a potential customer without knowing confidential information.

26 Claims, 4 Drawing Sheets

U.S. PATENT DOCUMENTS

| | | | |
|---|---|---|---|
| 6,088,683 | A | 7/2000 | Jalili |
| 6,173,269 | B1 | 1/2001 | Solokl et al. |
| 6,227,447 | B1 | 5/2001 | Campisano |
| 6,267,292 | B1 | 7/2001 | Walker et al. |
| 7,231,526 | B2 * | 6/2007 | Hon et al. .................. 713/185 |
| 2001/0034720 | A1 * | 10/2001 | Armes ........................ 705/65 |
| 2005/0054913 | A1 * | 3/2005 | Duerk et al. ................ 600/423 |

OTHER PUBLICATIONS

Kuykendall, Lavonne, "Single-Use Card Number Clicks with Microsoft", *American Banker (front page)*, (Jun. 4, 2001).

Lindsey, Rebecca, "Disposable Credit Card Numbers", http://www.debtsmart.com.pages/article_disposable.html (downloaded Jun. 8, 2004).

CNN.Com.U.S. News, "American Express to offer disposable credit card numbers", http://www.cnn.com/2000/US/09/08/online.payments.ap/ (downloaded Jun. 8, 2004).

ECG, ecommerce-guide.com, "Private Payments", http://products.ecommerce-guide.com/e-business/e-commerce/968418766.html (downloaded Jun. 8, 2004).

Express Internal Newswire, "American Express Announces Winners of 'Code Blue' Contest—Global Competition Spurs Innovation in Java Technology-Based Smart Card Development" (May 23, 2001).

Israel Seed Partners, "Press Room", http://www.israelseed.com/press/pressroom_detail.asp?id=74 (downloaded Jun. 8, 2004).

* cited by examiner

SINGLE USE USER IDS

FIELD OF THE INVENTION

The present invention generally relates to a system for facilitating Internet log-ins utilizing a single use user-identification. More particularly, the system allows a user to log-in to an access provider with a private, limited-use, user-identification without the need to disclose to the web site owner or others information regarding the user.

BACKGROUND OF THE INVENTION

The proliferation of the Internet has resulted in a thriving electronic commerce industry, where more and more products and services are available to consumers in a variety of non-traditional ways. For example, in traditional online consumer-merchant transactions, consumers typically provide merchants with transaction numbers (e.g., charge card numbers) from their existing debit, phone, credit or other transaction/service cards (e.g., American Express®, VISA®, MasterCard®, Discover Card®, AT&T®, MCI®, etc.). Some merchants or service providers, however, provide access to a web site with unique information, or other services, as opposed to merely selling products. Additionally, the web site provider may have a reason to want to provide a user with access to a site on a limited basis, in anticipation of the user electing to pay for products and/or services later. For purposes of this document, web site providers, merchants, service providers, or anyone else that may provide access to a service to customers may be called "access providers".

Currently, an access provider wishing to provide access to a web site could simply issue to the user a temporary login name and password. However, access providers are hesitant to provide free products or services to a user without some sort of assurance that the user may, in fact, become a paying customer in the future. For example, an access provider may provide users with free temporary trials for a web service, but users could wind up gaining nearly unlimited access to the site by simply re-applying for another temporary trial when the last one runs out. A potential solution to this would be to require that the user provide identification information, such as name, address, and phone number, before receiving a free trial. However, such a solution requires that the user give out personal information to the access provider. Many users are reluctant to give out such information for fear of being added to a mailing list or some other misuse of the information. Additionally, there are some free products or services that may be embarrassing to the user, such that he would be reluctant to remove the cloak of anonymity provided by the Internet (e.g., online pharmacies).

Thus, what is needed is a solution that allows guests to access a web site on a one time basis without revealing personal information while still providing the web site provider with a measure of assurance that the customer has proper credentials and is indeed a potential customer.

BRIEF DESCRIPTION

An access verifier may act as an intermediary to allow users to receive single use user IDs while protecting their anonymity. The access verifier has some relationship with the user that allows the access verifier to know details regarding the user that might be helpful in determining whether the user is a potentially desirable customer. The user may request a user ID from the access verifier. The user may then pass the user ID to the access provider when the user wishes to gain access. Upon receiving the user ID, the access provider may request verification that the ID is valid from the access verifier. The access verifier may respond that the ID is valid (if appropriate), and also may include user information. The access provider is thereby provided with some level of assurance that the user is a potential customer without knowing confidential information.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
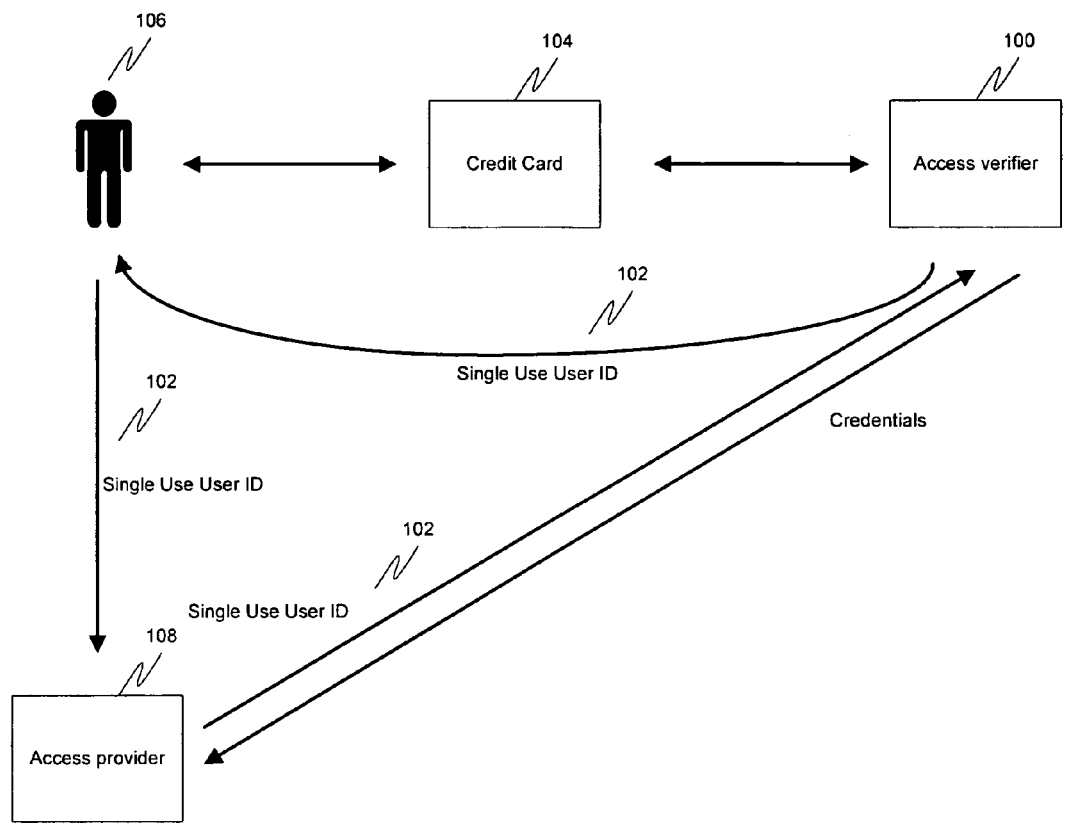
FIG. 1 is a diagram illustrating a system for facilitating a single access to a web site for a user in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A solution may be provided using an access verifier to provide single use user IDs. An access verifier may be any entity having information regarding the user that might be helpful in determining whether or not the user is a potential customer for the access provider. As such, the access verifier may take many forms. In one embodiment of the present invention, the access verifier may be a card payment system provider. For purposes of this document, the term card payment system may includes credit cards, charge cards, debit cards, ATM cards, calling cards, and any other cards used in lieu of cash when paying for products and/or services. In another embodiment of the present invention, the access verifier may be a business from which the user has made purchases in the past.

Communication between the parties (e.g., user, access provider, and/or access verifier) to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The present invention relates to a system wherein the access verifier acts as an intermediary to allow users to receive single use user IDs while protecting certain confidential information. The access provider may request a user ID to log in as a guest. Upon receiving the user ID, the access provider may request verification that the ID is valid from the access verifier. The access verifier may respond that the ID is valid (if appropriate), and also may include user information. The user information may be credential information, extremely specific information about the user (e.g., net worth), or more general user information (e.g., demographic information). Information such as the type of charge card the user maintains, reward point information, credit rating, or a user profile, could be a part of this. It could also simply be an index for the site to use to pull up such information. Regardless of the form taken, the user information may be such that it provides the access provider with some level of assurance that the user is a potentially desirable customer. The access provider may then grant the user access to the service or product without knowing confidential information.

As depicted in FIG. 1, the present invention generally relates to a transaction system where an access verifier 100 generates a single use user ID 102 that is associated with a designated account, i.e., a "primary account" (e.g., user's primary credit card 104 account), and provides this usable ID to the user 106 by any number of different delivery means. Without needing to separately activate the ID 102, the user 106 then may simply provide the ID 102 to an access provider 108, by any number of delivery means, to facilitate a log-in or other access in a confidential, yet secure, manner. The single use user ID 102 may have associated therewith user 106, access verifier 100 or access provider 108 defined conditions or parameters of use restrictions which limit use of the single use user ID 102. For example, the single use user ID may only be valid for a limited time. Moreover, while an exemplary embodiment of the present invention is described in association with a secure transaction system, the invention contemplates any type of networks or transaction systems, including, for example, unsecure networks, public networks, wireless networks, closed networks, open networks, intranets, extranets, and/or the like.

An exemplary user 106 is any individual, business, or other entity who uses a single use user ID 102 to facilitate any log-in or other transaction with an access provider requiring a user ID. In one embodiment, the user establishes a new or has an existing relationship or association with an access verifier 100. For example, in one embodiment, a user 106 may be an American Express® card member. In another embodiment, a user 106 is a participant in a frequent flier rewards program. In a further embodiment, the user 106 is a member of any suitable organization that provides transaction products or services.

An access provider 108 may be any individual, business, or other entity who requires a user ID to offer access to some service or product or other benefits to a user. The access provider 108 may be a merchant, or simply a service provider. For example, in one embodiment of the present invention, the access provider 108 may be an online bookstore such as Amazon.com®. In another embodiment, the access provider 108 may be a local plumber. In yet another embodiment, the access provider may be a stock advice web site. In a further embodiment, the access provider may be an online pharmacy.

The access itself may also take on many forms, and need not be restricted to any particular embodiments. For example, in one embodiment, the access may be access to a web site. In another embodiment, the access may be a free sample of a new over-the-counter drug from an on-line pharmacy.

An access verifier 100 may include any provider of products and/or services that has information regarding the user that might be helpful in determining whether or not the user is a potentially desirable customer for the access provider. For example, in one embodiment of the present invention, the access verifier 100 may be a card provider which establishes and maintains account and/or transaction information for the user 106. The access verifier 100 may issue products to the user 106 and may also provide both the user 106 and the access provider 108 with the processes to facilitate a secure transaction system. A card provider may include banks, credit unions, credit, debit or other charge card companies, telephone companies, or any other type of card-issuing institutions, such as card-sponsoring companies, incentive rewards companies, or third party providers under contract with financial institutions. In an exemplary system, the access verifier 100 may be any transaction facilitating company such as a transaction card provider like American Express®, VISA®, Mastercard®, Discover®, etc. In another embodiment, the access verifier 100 could be any membership organization or union.

The user ID itself may also take on many forms. For example, in one embodiment of the present invention, the user ID is an alphanumeric sequence used to log-in to a web site. In another embodiment, the user ID is a binary sequence. The user ID may have several parts. For example, the user ID may include both an ID portion and a password. Furthermore, the user ID itself need not be a separate identifier. Any identifier known to user and the access verifier would suffice as a user ID. For example, a card provider may provide a single use credit card number to a user. Such a number could also service as a user ID. In another example, the user have a smartcard issued by the access verifier that has another purpose. The "issuing" of a single-use user ID in that case could simply include modifying a database record to indicate that the user with that particular smartcard is entitled to access. Biometrics and Radio Frequency IDs (RFIDs) are other examples of identifiers that could potentially be used in lieu of the actual issuance of an alphanumeric or symbolic sequence.

In one embodiment of the present invention, the single use user ID 102 is randomly and instantaneously generated by the access verifier 100 upon a user's request, and can be distributed to the user 106 by a variety of methods (online, telephone, wireless, email, regular mail, etc.), all of which may be secure and dependent upon verification of the user's identity. In another embodiment of the present invention, the ID is generated upon an access provider's request. This embodiment would be useful, for example, if an access provider wanted to offer a free trial to a number of users when the users are not yet aware of the access provider. The access provider could request that the access verifier send out mailings to the users that include information about the free trial as well as the single use user ID.

The single use user ID 102 may be immediately active and usable once it is associated with the user (or even before) and provided to the user 106. This feature minimizes the possibility that an access provider 108 will obtain a user ID that in non-functional because it has not been properly activated by the user 106.

In another embodiment of the present invention, the single use user ID 102 may have limited-use (or conditions-of-use) parameters placed upon it by either the user 106, access verifier 100, or the access provider 108 in order for the ID to be restricted for particular uses. Parameters can include, for example: (1) the user ID is only valid until a certain date (2) the user ID is invalid at certain web sites (3) the user ID is only valid at a specific site; or (4) any combination of these or similar features.

These parameters not only provide increased security, allowing the parties to tailor the single use user ID 102 to a particular use, but an ancillary benefit is the ability of the user to control access for themselves or others who have registered eligibility to use the ID (e.g., spouse, children, etc.).

Another benefit of the present invention is that it allows for a chain of distribution to be tracked without revealing to certain entities confidential information about other entities. For example, an access provider may provide access to a user with the knowledge that the access verifier has more details about the user. This allows for easier compliance with new federal regulations regarding the distribution of goods or services, such as the USA Patriot Act.

Figure 2:
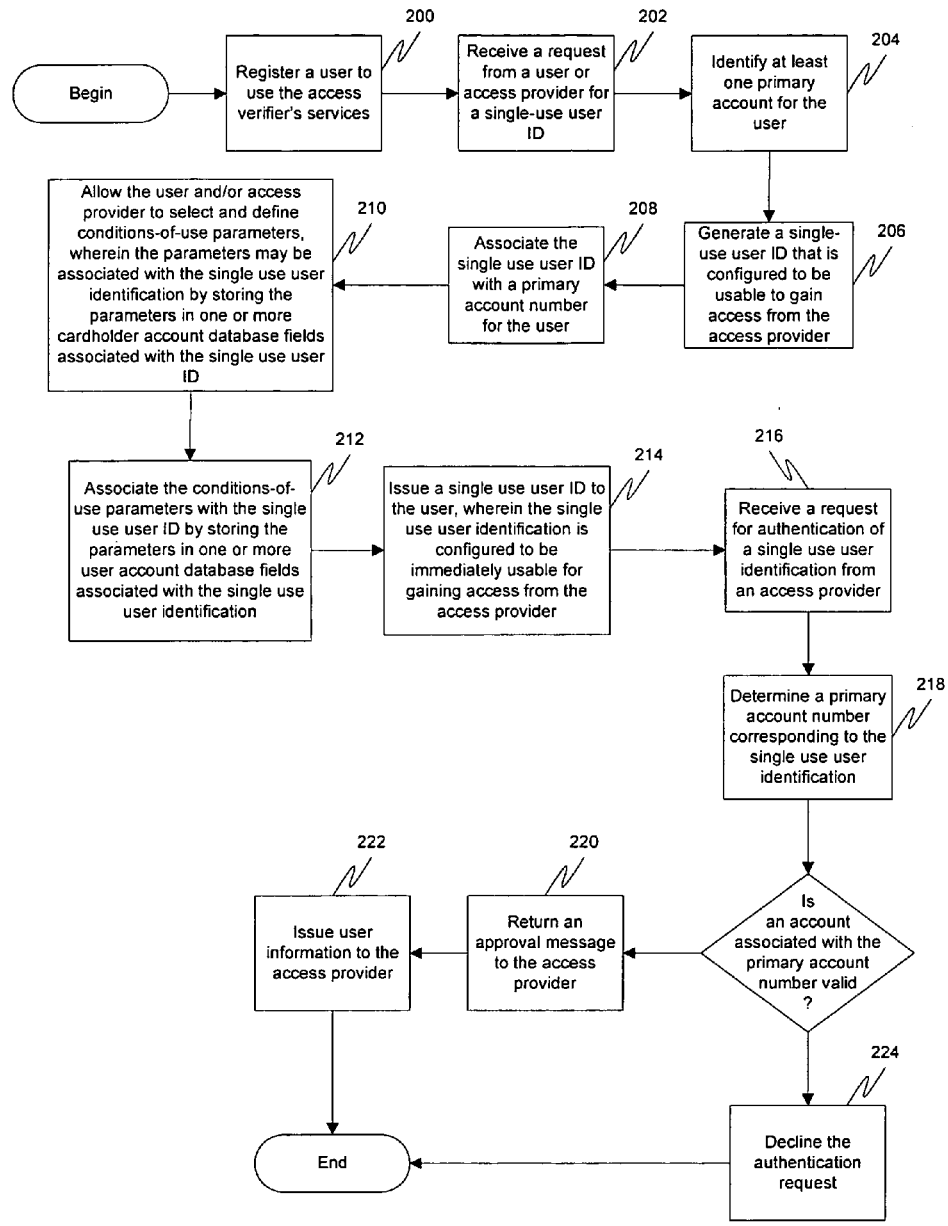
FIG. 2 is a flow diagram illustrating a method for facilitating a single access to a web site for a user in accordance with an embodiment of the present invention.

FIG. 2 is a flow diagram illustrating a method for facilitating a single access to a product or service for a user in accordance with an embodiment of the present invention. At 200, a user may be registered to use the access verifier's services. At 202, the access verifier may receive a request from a user (or access provider) for a single-use user ID. At 204, the access verifier may identify at least one primary account for the user. This may include receiving information from a user specifying a particular account and verifying that the account exists and is valid. At 206, the access verifier may generate a single-use user ID that is configured to be usable to gain access from the access provider. This may include randomly generating an alphanumeric code using a random number generator. At 208, the access verifier may associate the single use user ID with a primary account number for the user. At 210, the access verifier may allow the user and/or access provider to select and define conditions-of-use parameters, if desired, wherein the parameters place limits on how the single use user identification may be used. At 212, the conditions-of-use parameters may be associated with the single use user identification by storing the parameters in one or more user account database fields associated with the single use user identification. The conditions-of-use parameters may comprise, for example, an expiration date. At 214, the access verifier may issue the single use-user ID to the user, wherein the single use user identification is configured to be immediately usable for gaining access from the access provider. This may be facilitated by a user interface system.

Following a requested access to the access provider, at 216 a request for authentication of a single use user identification may be received from the access provider. Then, at 218, a primary account number corresponding to the single use user identification may be determined. At 220, the access verifier may return an approval message to the access provider if an account associated with the primary account number is valid. Additionally, at 222, the access verifier may issue user information to the access provider. If, on the other hand, no primary account number corresponding to the single use user identification can be found or an account associated with the primary account number is invalid, then at 224 the authentication request may be declined.

Figure 3:
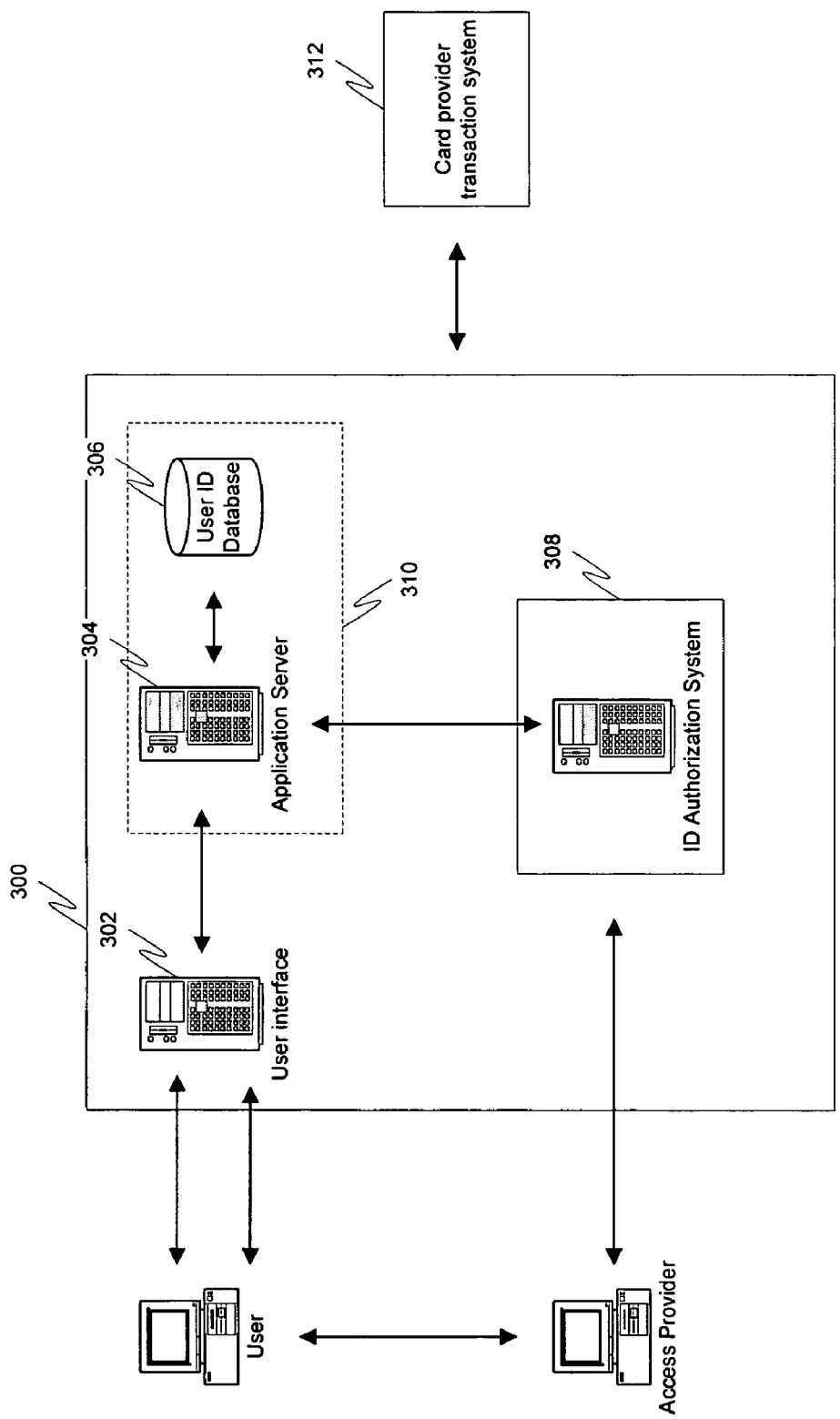
FIG. 3 is a block diagram illustrating a secure transaction system in accordance with an embodiment of the present invention.

FIG. 3 is a block diagram illustrating a secure transaction system in accordance with an embodiment of the present invention. In general, the card provider's computer system may utilize a front end 300 processing system. The front end 300 system may comprise a user interface system 302 (e.g., web server, etc.), an application server 304, a user ID database 306, and an ID authorization system 308. The application server 304 and the user ID database 306 may, at times, be referred to collectively as the ID processor 310. These front end 300 components facilitate (i) user registration, (ii) the processing of a request for a single use user ID, (iii) generation and issuance of the single use user ID, and (iv) authorization of a single use user ID. These components may be tied in with a card provider transaction system 312, which may handle typical card member transactions as well as provide credentials, account number, and other information to the front end 300 processing system that is required to issue and validate single use user-IDs.

More specifically, the access verifier's user interface system 302 may provide the user with access to the access verifier's services. It is through this interface that the user may register with the access verifier, may request a single use user ID, and in response thereto may receive from the access verifier a single use user ID that is associated with his primary account number. The front end 300 system may also utilize at least one application server 304 that processes incoming information, applies the appropriate business rules or conditions sets as necessary, and generates appropriate responses. The application server 304 may be configured to support interaction with the user interface system 302 and the user ID database 306. An exemplary user ID database 306 is a relational database comprising various tables for managing and translating a variety of information, such as user profiles, charge card data, transaction data, user ID data, web site provider data, conditions/rules set profiles, etc.

Figure 4:
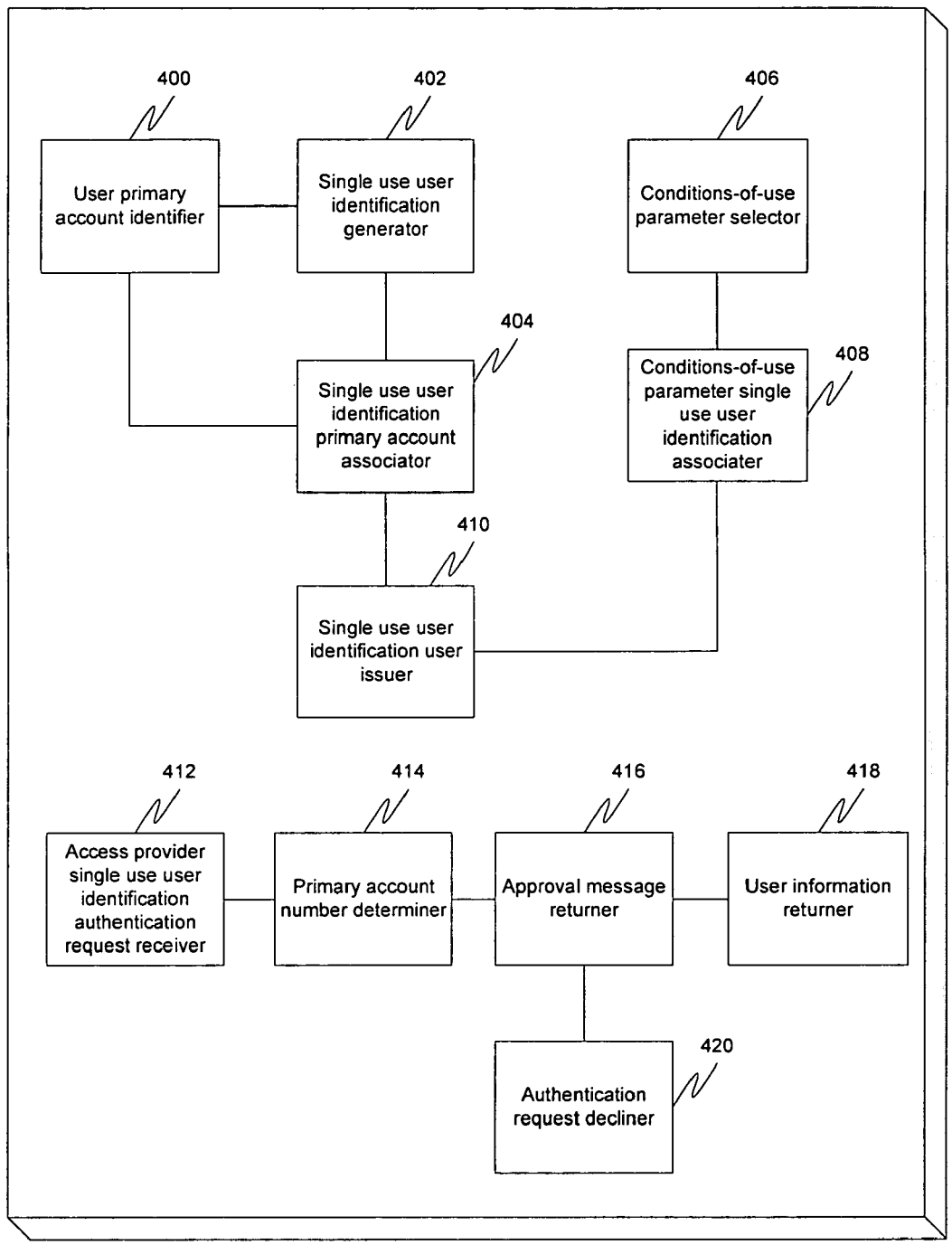
FIG. 4 is a block diagram illustrating an apparatus for facilitating a single access to a web site for a user in accordance with an embodiment of the present invention.

FIG. 4 is a block diagram illustrating an apparatus for facilitating a single access to a product or service for a user in accordance with an embodiment of the present invention. A user may be registered to use the access verifier's services. The access verifier may receive a request from a user (or access provider) for a single-use user ID. A user primary account identifier 400 may identify at least one primary account for the user. This may include receiving information from a user specifying a particular account and verifying that the account exists and is valid. A single use user identification generator 402 coupled to the user primary account identifier 400 may generate a single-use user ID that is configured to be usable to gain access from an access provider. This may include randomly generating an alphanumeric code using a random number generator. A single use user identification primary account associater 404 coupled to the single use user identification generator 402 and to the user primary account identifier 400 may associate the single use user ID with a primary account number for the user. A conditions-of-use parameter selector 406 may allow the user and/or access provider to select and define conditions-of-use parameters, if desired, wherein the parameters place limits on how the single use user identification may be used. A conditions-of-use parameter single use user identification associater 408 coupled to the conditions-of-use parameter selector 406 may then associate the conditions-of-use parameters with the single use user identification by storing the parameters in one or more user account database fields associated with the single use user identification. The conditions-of-use parameters may comprise, for example, an expiration date. A single use user identification user issuer 410 coupled to the single use user identification primary account associater 404 and to the conditions-of-use parameter single use user identification associater 408 may issue single use-user ID to the user, wherein the single use user identification is configured to be immediately usable for gaining access from the access provider. This may be facilitated by a user interface system.

Following a requested access to the access provider, an access provider single use user identification authentication request receiver 412 may receive a request for authentication of a single use user identification from an access provider. Then, a primary account number determiner 414 coupled to the access provider single use user identification authentication request receiver 412 may determine a primary account number corresponding to the single use user identification. An approval message returner 416 coupled to the primary account number determiner 414 may return an approval message to the access provider if an account associated with the primary account number is valid. A user information returner 418 coupled to the primary account number determiner 414 may issue user information regarding the user to the access provider. If, on the other hand, no primary account number corresponding to the single use user identification can be found or an account associated with the primary account number is invalid, then an authentication request decliner 420 coupled to the primary account number determiner 414 may decline the authentication request.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A method for facilitating a single access to an access provider for a user, the method comprising:
   identifying at least one primary account for the user;
   processing, by a card payment system provider, a plurality of financial transactions using said at least one primary account;
   determining, by the card payment system provider, that the user is a potential customer for an access provider based at least in part on user information not available to the access provider, wherein the user information not available to the access provider is derived, at least in part, from the plurality of financial transactions;
   generating a single use user identification that allows the user to gain access to the access provider, wherein the access is associated with a free trail;
   associating said single use user identification with said at least one primary account for the user;
   issuing said single use user identification to the user;
   receiving, by the card payment system provider, a request for authentication of said single use user identification from said access provider, the request not being related to a transfer of funds;
   determining a primary account number corresponding to said single use user identification; and
   returning an approval message to said access provider if an account associated with said primary account number is valid, wherein, based at least in part on the approval message, the user is granted access to the free trial provided by the access provider without the access provider receiving confidential user information from the user or the card payment provider system.

2. The method of claim 1, wherein said identifying includes:
   receiving information from a user specifying a particular account; and
   verifying that said account exists and is valid.

3. The method of claim 1, wherein said generating includes:
   randomly generating an alphanumeric code using a random number generator.

4. The method of claim 1, wherein the access provider is configured to read the single use user ID as part of a log-in process.

5. The method of claim 1, wherein said at least one primary account is associated with a physical charge card.

6. The method of claim 1, wherein said issuing is facilitated by a user interface system.

7. The method of claim 1, further comprising:
   registering a user to use a transaction configured to generate and issue a single use user identification.

8. The method of claim 1, further comprising:
   allowing the user to select and define conditions-of-use parameters, wherein the parameters place limits on how the single use user identification may be used; and
   associating the conditions-of-use parameters with the single use user identification by storing the parameters in one or more user account database fields associated with the single use user identification.

9. The method of claim 8, wherein the conditions-of-use parameters comprise an expiration date.

10. The method of claim 1, further comprising:
    returning information regarding said user to said access provider if an account associated with said primary account number is valid.

11. The method of claim 10, wherein said information regarding said user includes credential information.

12. An apparatus for facilitating a single access to a access provider for a user, the apparatus comprising:
    a user primary account identifier;
    a financial transaction processor that processes a plurality of transactions associated with said user primary account identifier;
    a potential customer identifier that identifies whether the user is a potential customer for an access provider based at least in part on user information not available to the access provider, wherein the user information not available to the access provider is derived, at least in part, from the plurality of financial transactions;
    a single use user identification generator coupled to said user primary account identifier that allows the user to gain access to the access provider, wherein the access is associated with a free trial;

a single use user identification primary account associater coupled to said single use user identification generator and to said user primary account identifier;

a single use user identification user issuer coupled to said single use user identification primary account associater;

an access provider single use user identification authentication request receiver that receives a request for authentication of said single use user identification from said access provider, the request not being related to a transfer of funds;

a primary account number determiner coupled to said access provider single use user identification authentication request receiver;

an approval message returner coupled to said primary account number determiner, wherein, based at least in part on the approval message, the user is granted access to the free trial provided by the access provider without the access provider receiving confidential user information from the user or the card payment provider system.

13. The apparatus of claim 12, further comprising:
a conditions-of-use parameter selector; and
a conditions-of-use parameter single use user identification associater coupled to said conditions-of-use parameter selector and to said single use user identification user issuer.

14. The method of claim 12, further comprising a user information returner coupled to said approval message returner.

15. An apparatus for facilitating a single access to an access provider for a user, the apparatus comprising:
means for identifying at least one primary account for the user;
means for processing, by a card payment system provider, a plurality of financial transactions using said at least one primary account;
means for determining, by the card payment system provider, that the user is a potential customer for an access provider based at least in part on user information not available to the access provider, wherein the user information not available to the access provider is derived, at least in part, from the plurality of financial transactions;
means for generating a single use user identification that allows the user to gain access to the access provider, wherein the access is associated with a free trial;
means for associating said single use user identification with said at least one primary account for the user;
means for issuing said single use user identification to the user;
means for receiving, by the card payment system provider, a request for authentication of said single use user identification from said access provider, the request not being related to a transfer of funds;
means for determining a primary account number corresponding to said single use user identification; and
means for returning an approval message to said access provider if an account associated with said primary account number is valid, wherein, based at least in part on the approval message, the user is granted access to the free trial provided by the access provider without the access provider receiving confidential user information from the user or the card payment provider system.

16. The apparatus of claim 15, wherein said means for identifying includes:
means for receiving information from a user specifying a particular account; and means for verifying that said account exists and is valid.

17. The apparatus of claim 15, wherein said means for generating includes:
means for randomly generating an alphanumeric code using a random number generator.

18. The apparatus of claim 15, wherein the access provider is configured to read the single use user ID as part of a log-in process.

19. The apparatus of claim 15, wherein said at least one primary account is associated with a physical charge card.

20. The apparatus of claim 15, wherein said issuing is facilitated by a user interface system.

21. The apparatus of claim 15, further comprising:
means for registering a user to use a transaction configured to generate and issue a single use user identification.

22. The apparatus of claim 15, further comprising:
means for allowing the user to select and define conditions-of-use parameters, wherein the parameters place limits on how the single use user identification may be used; and
means for associating the conditions-of-use parameters with the single use user identification by storing the parameters in one or more user account database fields associated with the single use user identification.

23. The apparatus of claim 22, wherein the conditions-of-use parameters comprise an expiration date.

24. The apparatus of claim 15, further comprising:
means for returning user information regarding said primary account number to said access provider if an account associated with said primary account number is valid.

25. The apparatus of claim 24, wherein said information regarding said user includes credential information.

26. A program storage device readable by a machine, tangibly embodying a program of instructions executable by the machine to perform a method for facilitating a single access to a access provider for a user, the method comprising:
identifying at least one primary account for the user;
processing, by a card payment system provider, a plurality of financial transactions using said at least one primary account;
determining, by the card payment system provider, that the user is a potential customer for an access provider based at least in part on user information not available to the access provider, wherein the user information not available to the access provider is derived, at least in part, from the plurality of financial transactions;
generating a single use user identification that allows the user to gain access to the access provider, wherein the access is associated with a free trial;
associating said single use user identification with said at least one primary account for the user;
issuing said single use user identification to the user;
receiving, by the card payment system provider, a request for authentication of said single use user identification from said access provider, the request not being related to a transfer of funds;
determining a primary account number corresponding to said single use user identification; and
returning an approval message to said access provider if an account associated with said primary account number is valid, wherein, based at least in part on the approval message, the user is granted access to the free trial provided by the access provider without the access provider receiving confidential user information from the user or the card payment provider system.

* * * * *